(12) United States Patent
Stone

(10) Patent No.: US 8,621,438 B2
(45) Date of Patent: Dec. 31, 2013

(54) GENERATING DEBUG INFORMATION ON DEMAND

(75) Inventor: Joshua Ian Stone, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 912 days.

(21) Appl. No.: 12/710,319

(22) Filed: Feb. 22, 2010

(65) Prior Publication Data

US 2011/0209125 A1 Aug. 25, 2011

(51) Int. Cl.
*G06F 9/44* (2006.01)

(52) U.S. Cl.
USPC .......................................... 717/127; 717/130

(58) Field of Classification Search
USPC .................... 717/127, 128, 130, 131
See application file for complete search history.

(56) References Cited

U.S. PATENT DOCUMENTS

| | | | | |
|---|---|---|---|---|
| 4,819,234 | A * | 4/1989 | Huber | 717/129 |
| 2007/0157174 | A1* | 7/2007 | Gebhardt et al. | 717/124 |
| 2007/0168909 | A1* | 7/2007 | Vaidyanathan et al. | 717/100 |
| 2010/0153939 | A1* | 6/2010 | Stall et al. | 717/158 |

OTHER PUBLICATIONS

Bugzilla, Bug 6921—Tracepoint Support, http://sourceware.org/bugzilla/show_bug.cgi?id-6921, specifically "Additional Comment #3 from Josh Stone, Feb. 21, 2009," as downloaded on Feb. 18, 2010, 3 pages.
Bugzilla, Bug 10055—On-the-Fly Type-Only Debuginfo Generation, http://sourceware.org/bugzila/show_bug.cgi?id=10055, Apr. 10, 2009, as downloaded on Feb. 18, 2010, 2 pages.

* cited by examiner

*Primary Examiner* — Anna Deng
(74) *Attorney, Agent, or Firm* — Lowenstein Sandler LLP

(57) ABSTRACT

An introspection tool monitors the execution of software. The operating system is being executed using an executable of a software source code file. The software source code file is associated with one or more additional source files. The introspection tool detects a trigger in a user script pertaining to monitoring of the execution of the software. The introspection tool identifies an additional source file that corresponds to the trigger in the user script and causes the additional source file to be compiled. The compiling of the additional source file generates debug information that pertains to the trigger and the introspection tool analyzes the debug information to respond to the trigger in the user script.

16 Claims, 7 Drawing Sheets

GENERATING DEBUG INFORMATION ON DEMAND

TECHNICAL FIELD

Embodiments of the present invention relate to generating debug information. Specifically, the embodiments of the present invention relate to generating debug information on demand.

BACKGROUND

An introspection tool allows users, such as software developers and system administrators, to examine the activities of software (e.g., operating system, application, program) while it is executing to help diagnose a performance or functional problem. An introspection tool can include tracing and probing features, for example, to allow a user to examine variables in the software code, and to 'hook' into the software code to gather information about the software. An introspection tool may use debug information to implement tracing and probing features.

Typically, debug information is provided by a debug package. In conventional methods, a user must manually download, install, maintain this extensive debug package. Installing the debug package, however, can be a time consuming process and once installed, the debug package may take over 1 GB of a computer's hard disk resources. A user must also continually maintain the debug package to ensure that it is up to date. A user may need to replace a debug package and thus, repeat the installation process.

The manual and time consuming process to download, install, and maintain a separate and extensive debug information package can place a burden on a software developer and can limit computer resources.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for generating debug information on demand. An introspection tool monitors the execution of software. The software is being executed using an executable, where the executable is created by compiling a software source code file. The software source code file is associated with one or more additional source files. The introspection tool receives a user script pertaining to monitoring of the software and detects a trigger in the user script. The introspection tool identifies an additional source file that corresponds to the trigger in the user script and causes the additional source file to be compiled. The compiling of the additional source file generates debug information that pertains to the trigger and the introspection tool analyzes the debug information to respond to the trigger in the user script.

Typically, debug information is provided by a debug package. In conventional methods, a user must download and install a debug package. Installing the debug package, however, can be a time consuming process and once installed, the debug package may take over 1 GB of a computer's hard disk resources. Embodiments of the present invention enable an introspection tool to generate debug information on demand in response to a trigger in a user script. By generating the particular debug information on demand, a user does not need to manually download, install, and maintain a separate and extensive debug information package.

Figure 1:
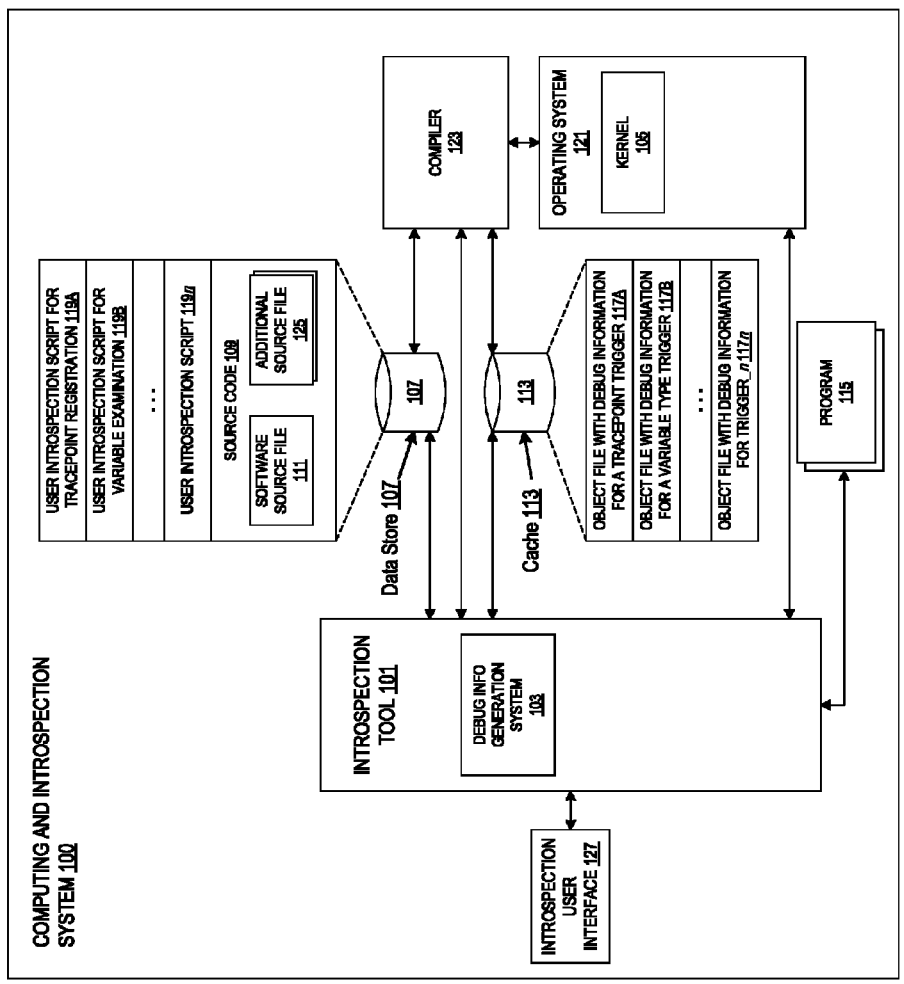
FIG. 1 illustrates an exemplary computing and introspection system in which embodiments of the present invention may operate.

FIG. 1 illustrates an exemplary computing and introspection system 100 for generating debug information on demand in accordance with some embodiments of the invention. The computing and introspection system 100 can be hosted by a computer system including one or more computing machines (e.g., a server, client, workstation, desktop, tablet, one or more small portable platforms such as a notebook, a PDA (personal digital assistant), or wireless web devices, and other devices). An exemplary computer system is described in greater detail below in conjunction with FIG. 7. The computing and introspection system 100 can include an introspection tool 101, one or more programs 115, an operating system 121, a data store 107, an introspection user interface 127, a compiler 125, and a cache 113.

An introspection tool 101 allows users, such as software developers and system administrators, to examine and monitor the activities of software that is executing, to help diagnose a performance or functional problem. Examples of software include an operating system 121, programs 115, applications, etc. The software can be executed using an executable of the software, where the executable is created by compiling a software source file 111. The software source file 111 is associated with additional source files 125. For example, the operating system 121 can be executed using an executable of a kernel, where the executable is created by compiling a kernel source file. The additional source files 125 may include source files for generating debug information that do not need to be compiled when creating an executable of the software. The additional source files 125 are described in greater detail below in conjunction with FIG. 2. The kernel 105 is the central component of an operating system 121 that bridges applications and the actual data processing that is performed at the hardware level. An example of an operating system 121 is the Linux® operating system. An example of an introspection tool 101 for examining a Linux® operation system is the SystemTap introspection tool.

An introspection tool 101 can include tracing and probing features, for example, to allow a user to examine variables in a software code (e.g., kernel 105 code, program 115 code), and to 'hook' into the software to gather information about the software.

A user (e.g., software developer, system administrator) can use introspection scripts 119A-119n (user scripts) to run an introspection tool 101. The user scripts can be used to implement the tracing and probing features for monitoring and examining the software (e.g., program 115, operating system 121). For example, a user can write a user script 119B for examining the variables of a kernel 105 code or other program 115 code. In another example, a user can write a user script 119A for receiving notification when a specific event occurs in the kernel 105. A user can use an introspection user interface 127 to write the user scripts 119A-119n. The introspection user interface 127 can be a graphical user interface (GUI).

A user script 119A-119n can include a probe (or probe point) and a handler subroutine for the probe. A probe can identify a variable in the software code, a particular place in the software code, or a particular event in the software that may occur at any time. A handler is a subroutine in the user script 119A-119n that is run whenever a probe is 'hit', such as whenever a variable is detected in the software code, whenever an event occurs or a place in the software code is reached. A subroutine can include a series of script language statements that specify an action to be performed when a probe is 'hit'. Examples of an action to be performed can include, and are not limited to, extracting data from the event context, storing data into an internal variable, and printing results.

For example, a user can write a user script 119B that places a probe in the kernel 105 code to allow a user to examine a variable in the code. The introspection tool 101 can receive the user script 119B to allow a user to access the variable information in the kernel 105 code. An exemplary user script 119B for obtaining information about the variable type and information about the members of the variable type is described in greater detail below in conjunction with FIG. 6.

In another example, a user can write a user script 119A that instructs the introspection tool 101 to register a callback function with a tracepoint, such that, when the event that is marked by the tracepoint occurs, the callback function is called. Software code (e.g., kernel 105 code, program 115 code) can include tracepoints to mark specific events that occur in the software or particular places in the software. For example, a developer of a kernel 105 can mark these specific events and places with the tracepoints. Examples of an event that may be marked with a tracepoint can include, and are not limited to, entering or exiting a function, a timer expiring, when data is written to disk, and when the introspection program session starts or stops. The introspection tool 101 can receive a user script 119A that instructs the introspection tool 101 to register a callback function with a tracepoint in order to receive notification of when an event that is marked by the tracepoint occurs. An exemplary user script 119A for registering a callback function with a tracepoint is described in greater detail below in conjunction with FIG. 4.

A user script 119A-119n can include one or more triggers, which the introspection tool 101 can detect, that indicates, for example, whether a user script 119A-119n is for variable examination or for tracepoint registration. Examples of triggers can include, and are not limited to, the name of a tracepoint in a user script 119A for which the introspection tool 101 is to register a callback function with, and the name of a variable type in a user script 119B for which the introspection tool 101 is to obtain information about.

The introspection tool 101 can detect a trigger in a user script (e.g., user script 119A,119B) and respond to the trigger by generating appropriate debug information. Typically, debug information is provided by a debug package (not shown) that is separate from the software source file 111 and the additional source files 125. In conventional methods, a user must download and install the debug package, which can be a time consuming process. Once installed, the debug package may take over 1 GB of a computer's hard disk resources and a user must also continually and manually maintain the debug package to ensure that it is up to date. A user may need to replace a debug package and thus, repeat the installation process. Embodiments of the invention enable the introspection tool 101 to generate debug information on demand while monitoring the execution of the software in response to a trigger in a user script 119A-119n, using the additional source files 125.

The introspection tool 101 can include a debug information generation system 103 for generating debug information on-the-fly. That is, the debug information generation system 103 can detect a trigger in a user script 119A-119n and immediately generate debug information that pertains to the trigger. For example, when monitoring the execution of the operating system, the debug information generation system 103 can detect a trigger, such as a variable type name, in a user script 119B, and dynamically generate debug information (debug information 117B) that can be used to obtain information about the variable. The introspection tool 101 can then use this debug information 117B to obtain information about how the variable is structured and how to read the members inside of that variable.

In another example, as soon as the debug information generation system 103 detects a trigger, such as a tracepoint name, in a user script 119A, the introspection tool 101 can generate debug information (debug information 117A) that can be used to obtain information about the structure of the tracepoint. The introspection tool 101 can then use this debug information 117A to create the callback function that will be registered with the tracepoint. The introspection tool 101 can examine the debug information 117A pertaining to a tracepoint to determine a structure for the callback function.

To generate the debug information 117A-117n, the debug information generation system 103 can identify an additional source file 125 that corresponds to the trigger in a user script 119A-119n and can cause a compiler 123 to compile the additional source file 125. Source code 109 is logic that defines functions to be performed. Source code 109 can include a software source file 111 used for creating an executable of the software and one or more additional source files 125 used for generating debug information 117A-117n. The additional source files 125 are source files that do not need to be compiled when creating an executable of the software.

The additional source files 125 can include a debug source file that corresponds to a tracepoint trigger. In one embodiment, when the debug information source file 111 is compiled, it creates a 'dummy' C module that includes information about the structure of all of the tracepoints that are defined in the software. An exemplary debug information source file is described in greater detail below in conjunction with FIG. 4. The debug information source file can be created by the introspection tool 101 when the introspection tool 101 detects a trigger, such as a tracepoint name trigger, in a user script 119A. When the debug information source file is compiled, an object file is created that includes debug information for registering a callback function with a tracepoint. The object file that has the debug information 117A includes information about how the introspection tool 101 should structure the callback function that will be registered with the tracepoint.

The additional source files 125 can include one or more header source files that correspond to variable type name triggers. A user can install software development tools, which are separate from the software source files 111, that include the header source files. A header source file can define one or more variable types. When compiled, a header source file creates an object file with debug information 117B, such that the introspection tool 101 can obtain variable type information from the debug information 117B. Exemplary header source files are described in greater detail below in conjunction with FIG. 5.

The introspection tool 101 and the compiler 125 can be coupled to a data store 107 for storing the logic (e.g., source code 109) and the user scripts 119A-119n. The data store 107 can be implemented on a main memory (not shown) or other data storage device (not shown). The data store 107 can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

The debug information generation system 103 can cause a compiler 123 to compile the additional source files 125 for generating debug information 117A-117n. When the compiler 123 compiles an additional source file 125 (e.g., a debug information source file, a header source file), the compiler 123 generates an object file that includes debug information 117A-117n that pertains to the trigger. An example of a compiler is the GNU Compiler Collection (GCC). The compiler 123 can be configured to generate debug information 117A-117n when the compiler 123 compiles the source code 109. The introspection tool 101 can store an object file with debug information 117A-117n in a cache 113.

The introspection tool 101 can analyze an object file that includes the debug information 117A-117n that corresponds to a trigger in the user script 119A-119n to respond to the trigger. For example, when a user script 119A includes a trigger that is the name of a tracepoint, the introspection tool 101 can analyze the object file that includes the debug information 117A pertaining to the tracepoint name to determine how to create the structure of a callback function that will be registered with the tracepoint. The introspection tool 101 can respond to the tracepoint name trigger by creating the callback function based on the structure identified in the debug information 117A and creating a source file (not shown) that includes the callback function that is created. The introspection tool 101 can cause the compiler 123 to compile the source file, which includes the callback function, into a kernel module (not shown) and can register the callback function with the tracepoint by loading and running the kernel module.

The debug information generation system 103 can be implemented as hardware, computer-implemented software, firmware or a combination thereof. In one embodiment, the introspection tool 101 comprises instructions stored in memory 704 that cause a processing device 702 in FIG. 7 described in greater detail below to perform the functions of the introspection tool 101.

Figure 2:
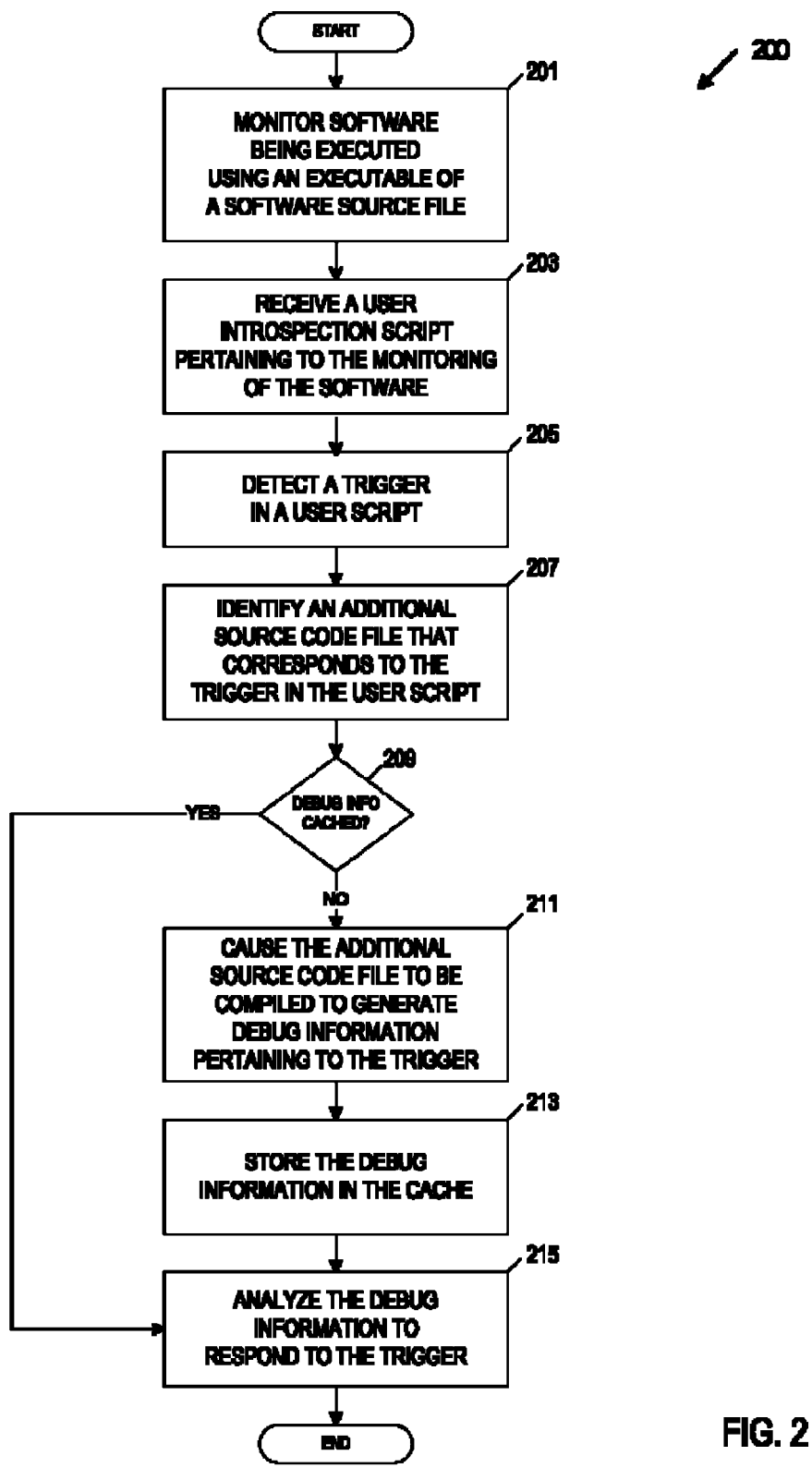
FIG. 2 is a flow diagram which illustrates an embodiment of a method for generating debug information on demand.

FIG. 2 is a flow diagram which illustrates an embodiment of a method 200 for generating debug information on demand. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the introspection tool 101 in a programming and introspection system 100 of FIG. 1.

In one embodiment, the method 200 starts with executing an introspection tool to monitor software at block 201. The software can be executed using an executable of the software, where the executable is created by compiling the software source code file. For example, an operating system can be executed using an executable of the kernel, where the executable is created by compiling the kernel source code file. The software source code file can be associated with additional source files. The additional source files are source files for generating debug information that do not need to be compiled when creating an executable of the kernel.

At block 203, the introspection tool receives a user script that pertains to the monitoring of the software (e.g., operating system, application, program). A user script may be an existing script selected by the user from the scripts stored in a script store, or any script submitted by the user. For example, a user can write a script that places a probe in the kernel code to allow the user to examine a variable in the code. In another example, a user can write a script that instructs the introspection tool to register a callback function with a tracepoint, such that, when the event that is marked by the tracepoint occurs, the callback function is called.

At block 205, the introspection tool detects a trigger in the user script. Examples of triggers can include, and are not limited to, the name of a tracepoint in a user script for which the introspection tool is to register a callback function with, and the name of a variable type in a user script for which the introspection tool is to obtain information about.

At block 207, the introspection tool identifies an additional source file that corresponds to the trigger. For example, where the trigger is a tracepoint name in a user script for which the introspection tool is to register a callback function with, the introspection tool identifies a debug information source file as the corresponding additional source file. In another example, where the trigger is a variable type name in a user script for which the introspection tool is to obtain information about, the introspection tool identifies a name of a header source file in the user script as the corresponding additional source file.

At block 209, the introspection tool searches the cache to determine whether the debug information that pertains to the trigger (e.g., tracepoint name, variable type name) is already stored in the cache. For example, the introspection tool may have previously generated debug information that pertains to a trigger and stored the debug information in the cache. The introspection tool can search the cache for an object file that was generated using the source file that corresponds to the trigger. For example, for a tracepoint name trigger, the introspection tool can search the cache for an object file that was generated from the debug information source file. For a variable type name trigger, the introspection tool can search the cache for an object file that was generated from a header source file that is identified in the user script.

If there is already debug information that pertains to the trigger stored in the cache (block 209), the method continues to block 215. If there is not already debug information that pertains to the trigger stored in the cache (block 209), the introspection tool causes a compiler to compile the additional source file that corresponds to the trigger to generate debug information pertaining to the trigger at block 211. The debug information is generated on-the-fly. That is, the introspection tool can generate debug information that pertains to the trigger while monitoring the execution of the software and as soon as the introspection tool detects a trigger in a user script and determines that the debug information is not already stored in the cache.

At block 211, when the compiler compiles an appropriate additional source file, the compiler generates an object file that includes debug information that pertains to the trigger. An example of a compiler is the GNU Compiler Collection (GCC). A compiler can be configured to generate debug information when the compiler compiles the additional source file.

For instance, a user can use debugging flags to configure the compiler to generate debug information. For example, GCC has a '-g' flag which allows a user to configure the compiler to compile source code to generate object files that include debug information. At block 213, the introspection tool can store an object file with debug information in the cache.

At block 215, the introspection tool analyzes an object file that includes the debug information corresponding to a trigger. For example, when the trigger is the name of a tracepoint in a user script for which the introspection tool is to register a callback function with, the introspection tool ascertains the structure of the tracepoint for which the callback function will be registered with from the debug information and creates the callback function based on the tracepoint structure in the debug information. The introspection tool can create a designated source file for the callback function and cause the compiler to compile this source file into a kernel module. The introspection tool responds to the tracepoint name trigger in the user script by registering the callback function with the tracepoint when loading and running the kernel module.

In another example, when the trigger is the name of a variable type for which the introspection tool is to obtain information about, the introspection tool determines the structure of the variable type and how to access a member inside that structure. The introspection tool responds to a variable type name trigger in a user script by creating a designated source file that includes a function for accessing the member and causing a compiler to compile the source file into a kernel module. The introspection tool can load and run the kernel module for accessing the variable and the member in the variable that is specified in the user script.

Figure 3:
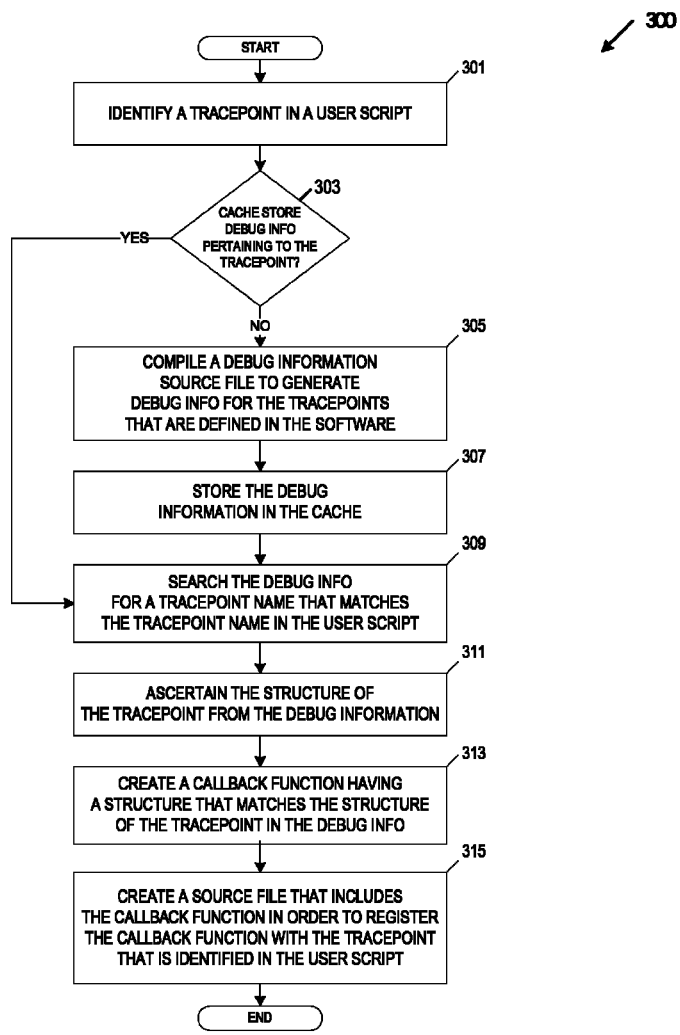
FIG. 3 is a flow diagram which illustrates an embodiment of a method for generating debug information on demand for tracepoint registration.

FIG. 3 is a flow diagram which illustrates an embodiment of a method 300 for generating debug information on demand for tracepoint registration. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the introspection tool 101 in a programming and introspection system 100 of FIG. 1.

In one embodiment, the method 300 can be initiated upon the execution of an introspection tool to monitor software and the introspection tool receiving a user script that instructs the introspection tool to register for a tracepoint. At block 301, the introspection tool detects a name of a tracepoint in the user script for which the introspection tool is to register a callback function with. For example, the introspection tool examines a user script and identifies a probe for a tracepoint with the name 'sched_kthread_stop'.

At block 303, the introspection tool determines whether debug information pertaining to the tracepoint is already stored in a cache. The introspection tool identifies the debug information source file as the additional source file that corresponds to the tracepoint name trigger and searches the cache for an object file that was generated from the debug information source file. If there is already debug information, which was generated from the debug information source file, stored in the cache (block 303), the method continues to block 309. If there is not already debug information, which was generated from the debug information source file, stored in the cache (block 303), the introspection tool causes a compiler to compile the debug information source file to generate debug information pertaining to the tracepoint name at block 305. The debug information is generated on-the-fly. That is, the introspection tool can generate debug information that pertains for the tracepoint as soon as the introspection tool detects a tracepoint name trigger in the user script and determines that the debug information is not already stored in the cache.

At block 305, when the compiler compiles the debug information source file, the compiler generates an object file that includes debug information. The debug information may contain information for more than one tracepoint. The debug information in the object file can include functions for all of the tracepoints that are defined in the kernel. Each function in the debug information has the proper structure for which the introspection tool can use to create a callback function to register with a tracepoint. At block 307, the introspection tool stores the object file with the debug information in the cache.

At block 309, the introspection tool searches the object file for a tracepoint name that matches the tracepoint name in the user script. For example, the introspection tool searches the debug information in the object file for the name 'sched_kthread_stop'.

Figure 5:
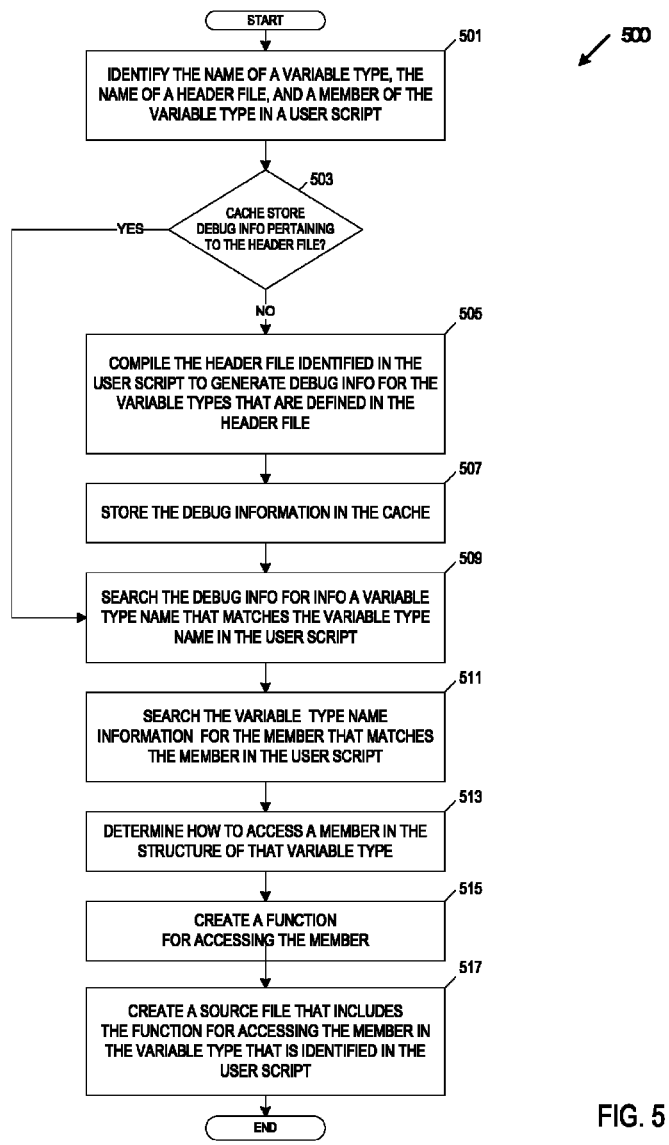
FIG. 5 is a flow diagram which illustrates an embodiment of a method for generating debug information on demand for accessing information pertaining to a variable type and the members of a variable type.

At block 311, the introspection tool ascertains the structure of the tracepoint from the debug information. The introspection tool can determine a structure of the function that corresponds to the tracepoint name (e.g., can determine the structure of the function that corresponds to 'sched_kthread_stop'). The introspection tool can determine from the function what type of arguments and parameters will be passed to a callback function. With this information, the introspection tool can create a callback function that has a structure that matches the structure of the tracepoint (e.g., 'sched_kthread_stop') in the debug information at block 313. The introspection tool can create a callback function that can receive the types of arguments and parameters that are identified at block 311. For example, the introspection tool can determine that the tracepoint 'sched_kthread_stop' has a structure that receives a parameter, such as a pointer to 'task_struct', and the introspection tool can create a callback function that can receive "task_struct' as a parameter at block 313. The user script can also include a handler that identifies a parameter to access, such as parameter 't', or a member or field of a structure to access in reference to a parameter. The introspection tool can also examine the debug information to determine how to access a member, a field, and a parameter. FIG. 5 describes an embodiment of how to access a member, a field, and a parameter in greater detail below.

At block 315, the introspection tool creates a designated source file for the callback function. The introspection tool can cause the compiler to compile this source file into a kernel module. The introspection tool responds to a tracepoint name trigger in the user script by registering the callback function with the tracepoint as instructed in the user script when loading and running the kernel module. When the event that is marked by the tracepoint occurs, the callback function will be called. Thus, the introspection tool can receive notification of when an event occurs.

Figure 4:
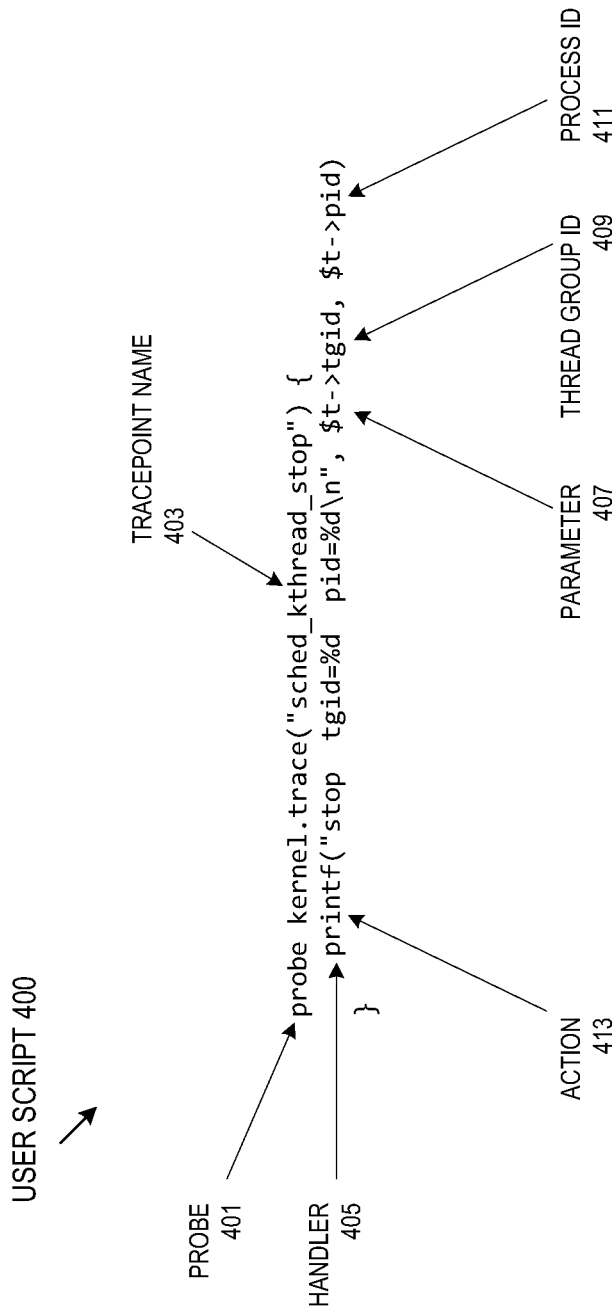
FIG. 4 illustrates an exemplary user script for tracepoint registration.

FIG. 4 illustrates an exemplary user introspection script 400 (user script) for tracepoint registration and components of the user script 400. The user script 400 includes a probe 401 (probe point) for a tracepoint for which an introspection tool is to register a callback function with and the name of the tracepoint 403, 'sched_kthread_stop'. The user script 400 can also include a handler 405 that identifies a parameter 407 of the tracepoint and an action 413 (e.g., print results) to be performed using the parameter 407. Parameter 407 is parameter '$t'. The handler 405 in the user script 400 indicates that the thread group identifier 409 ('tgid') and process identifier 411 ('pid') with reference to the tracepoint parameter '$t' 407 should be printed 413 when the event that is marked by the tracepoint name 403 'sched_kthread_stop' occurs.

An introspection tool can detect the tracepoint name 403 'sched_kthread_stop' and cause a compiler to compile a debug information source file to generate debug information for the tracepoint name 403 'sched_kthread_stop'. The debug information may contain information for more than one tracepoint. The introspection tool can search the debug information for a tracepoint name that matches 'sched_kthread_stop' and determine how to structure a callback function that is to be registered with the tracepoint 'sched_kthread_stop'. The introspection tool can also examine the debug information to determine how to access a member, a field, and a parameter, for example as defined in handler 405. FIG. 5 describes an embodiment of how to access a member, a field, and a parameter in greater detail below. For example, the introspection tool can determine how to access the thread group identifier 409 ('tgid') member and process identifier 411 ('pid') member with reference to the tracepoint parameter '$t' 407.

FIG. 5 is a flow diagram which illustrates an embodiment of a method 500 for generating debug information on demand for accessing information pertaining to a variable type and the members of that variable type. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the introspection tool 101 in a programming and introspection system 100 of FIG. 1.

Figure 6:
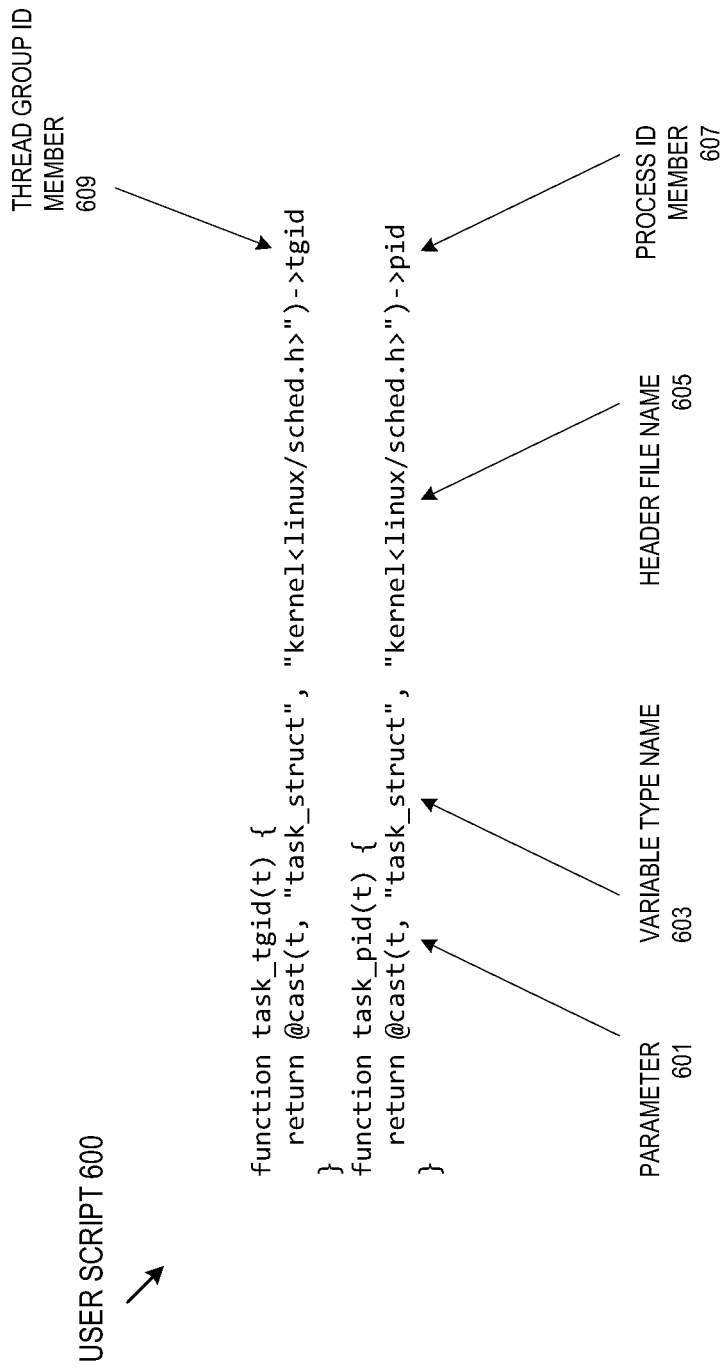
FIG. 6 illustrates an exemplary user script for obtaining information pertaining to a variable type and the members of a variable type.

In one embodiment, the method 500 can be initiated upon the execution of an introspection tool to monitor software and the introspection tool receiving a user script that instructs the introspection tool to allow a user to examine a variable type and the members of that variable type. At block 501, the introspection tool detects a name of a variable type, a name of a header file, and a member of that variable type in the user script. FIG. 6 illustrates an exemplary user introspection script 600 (user script) obtaining information pertaining to a variable type and the members of a variable type and components of the user script 600. The user script 600 includes a variable type name 603 'task_struct', a header file name 605 'kernel<linux/sched.h>', member 607 for a process identifier ('pid'), and member 609 for a thread group identifier ('tgid'). The user script 600 also includes a parameter 601 't'.

Returning to FIG. 5, at block 503, the introspection tool determines whether debug information pertaining to the variable type name is already stored in a cache. The introspection tool identifies the header file from the user script as the additional source file that corresponds to the variable type name trigger and searches the cache for an object file that was generated from the identified header file. For example, the introspection tool can search the cache for an object file that corresponds to 'linux/sched.h'.

If there is already debug information, which was generated from the header file, stored in the cache (block 503), the method continues to block 509. If there is not already debug information, which was generated from the header file, stored in the cache (block 503), the introspection tool causes a compiler to compile the header file to generate debug information pertaining to the variable type name at block 505. The debug information is generated on-the-fly. That is, the introspection tool can generate debug information that pertains for the tracepoint as soon as the introspection tool detects a tracepoint name trigger in the user script and determines that the debug information is not already stored in the cache.

At block 505, when the compiler compiles the header file, the compiler generates an object file that includes debug information. The debug information may contain debug information for more than one variable type. The debug information in the object file can include structure, layout, and member information for all of the variable types that are defined in the header file. For example, the structure and layout information for a variable type can identify the fields that are in the structure of that particular variable type, the names of the fields, and what type each field may have. The debug information can also provide information that describes how to access a member or field in the structure of that variable type. For example, the debug information can describe the number of bytes for a member inside the structure of the variable type.

At block 507, the introspection tool stores the object file with the debug information in the cache. At block 509, the introspection tool searches the object file for information for a variable type name that matches the variable type name in the user script. For example, the introspection tool searches the debug information in the object file for the name 'task_struct'.

At block 511, the introspection tool searches the variable type name information for information for a member that matches the member in the user script. For example, user script 600 includes the member 609 'tgid' and the member 607 'pid'. The introspection tool searches the variable type name information for 'tgid'. The introspection tool can also search the variable type name information for 'pid'.

At block 513, the introspection tool determines how to access the member from the member information. The debug information can include member information that describes how to access a member or field in the structure of that variable type. The introspection tool can examine the member information to determine how to access a member or a field. For example, the debug information can describe that the member 'tgid' is 24 bytes insides of the variable type 'task_struct' and that the pointer to the beginning of the structure is parameter 't'. The introspection tool can calculate how to access the member 'tgid' from the parameter 't'. At block 515, the introspection tool creates a function for accessing the variable and the member of the variable. At bloc 517, the introspection tool creates a designated source file that includes the function for accessing the member. The introspection tool can cause a compiler to compile the designated source file into a kernel module. The introspection tool can respond to the trigger by loading and running the kernel module to access the variable and the member in the variable that is specified in the user script.

Figure 7:
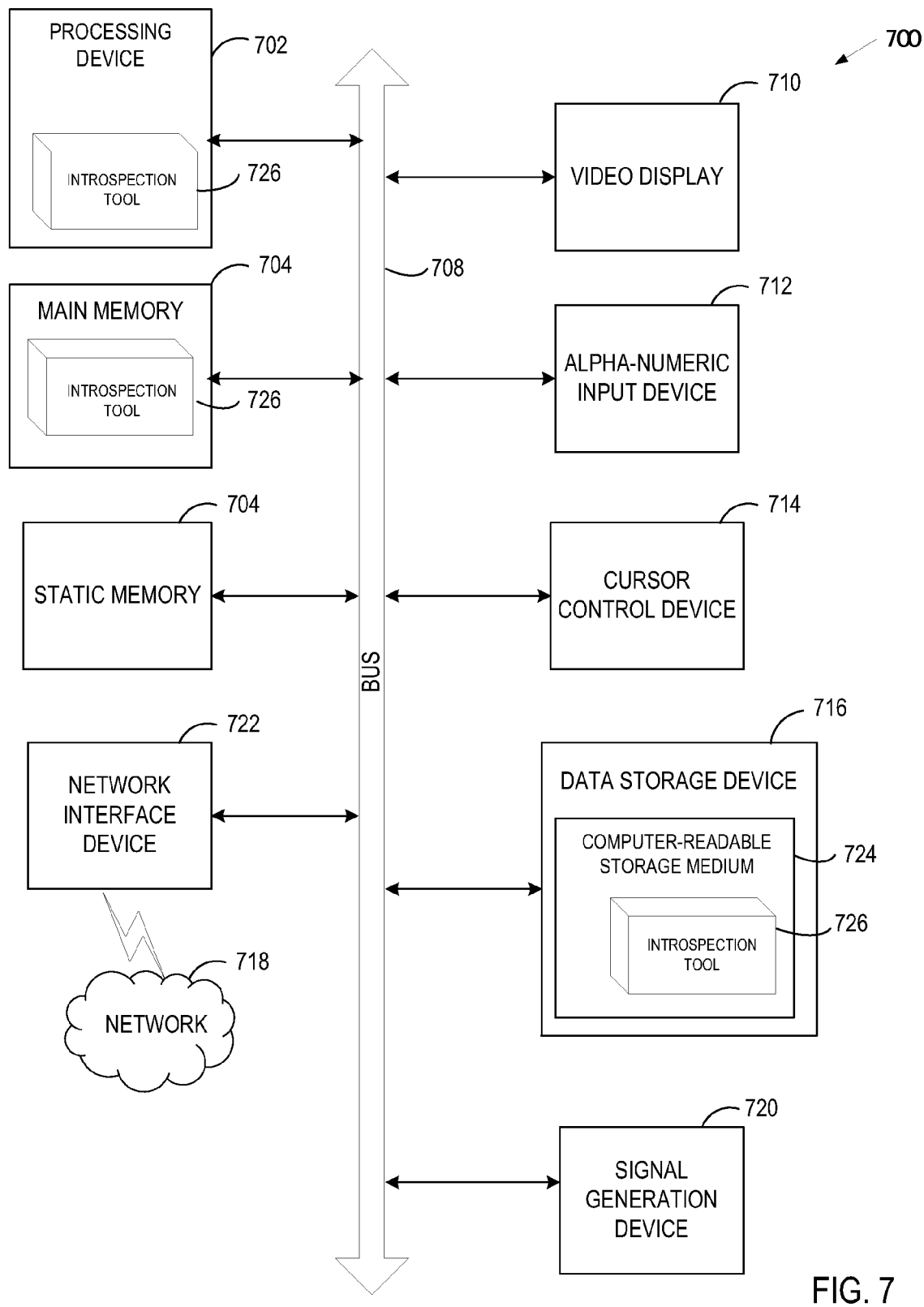
FIG. 7 is a diagram of one embodiment of a computer system for generating debug information on demand.

FIG. 7 is a diagram of one embodiment of a computer system for simulating a correct line of source code. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, registers 728, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 can contain several kinds of registers, such as address registers 728. Address registers 728 can hold addresses that may be instructions that indirectly access memory. Processing device 702 is configured to execute the introspection tool 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the introspection tool 726) embodying any one or more of the methodologies or functions described herein. The introspection tool 726 may also reside, completely or at least partially, within the main memory 704 and/or within the processing device 702 during execution thereof by the computer system 700, the main memory 704 and the processing device 702 also constituting machine-readable storage media. The introspection tool 726 may further be transmitted or received over a network 718 via the network interface device 722.

The computer-readable storage medium 724 may also be used to store the introspection tool 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The introspection tool 726, components and other features described herein (for example in relation to FIG. 1) can be implemented as discrete hardware components or integrated in the functionality of hardware components such as ASICS, FPGAs, DSPs or similar devices. In addition, the introspection tool 726 can be implemented as firmware or functional circuitry within hardware devices. Further, the introspection tool 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "monitoring," "receiving," "detecting," "identifying," "causing," "analyzing," "searching," "determining," "creating,' "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for generating debug information on demand. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
monitoring, by an introspection tool hosted by a computing system, an execution of software, the software being executed using an executable of a software source code file, the software source code file being associated with one or more additional source files;
detecting, by the introspection tool, a trigger in a user script pertaining to monitoring of the execution of the software, wherein the trigger comprises a variable type name or a tracepoint name;
identifying, by the introspection tool, an additional source file that corresponds to the trigger in the user script by identifying the additional source file that corresponds to at least one of the tracepoint name or the variable type name;
generating debug information describing a structure of the trigger by compiling the additional source file, wherein the debug information comprises at least one of functions for tracepoints that are defined in the software or information for more than one variable type name; and
identifying, by the introspection tool, the structure specified in the debug information to respond to the trigger in the user script by searching the debug information for a tracepoint name that matches the tracepoint name in the trigger or searching the debug information for a variable type name that matches the variable type name in the trigger.

2. The method of claim 1, wherein the trigger in the user script comprises the tracepoint name for which the introspection tool is to register a callback function with.

3. The method of claim 2, wherein identifying the structure specified in the debug information to respond to the trigger further comprises:
identifying a function that corresponds to the tracepoint name in the debug information that matches the tracepoint name in the user script;
determining a structure of the identified function; and
creating a source file for registering the tracepoint that includes a callback function using the structure of the identified function.

4. The method of claim 3, further comprising:
identifying a parameter and a member in the user script;
examining the debug information to determine how to access the member using the parameter; and creating a source file that includes a function for accessing the member using the parameter.

5. The method of claim 1, wherein identifying the additional source file that corresponds to the trigger comprises:
identifying a name of a header file in the user script in response to the trigger being the variable type name; and
identifying the header file in a persistent storage unit that has a name that matches the name of the header file in the user script.

6. The method of claim 1, wherein identifying the structure specified in the debug information to respond to the trigger further comprises:
searching the information for a member that matches a member in the user script;
examining the information to determine how to access the member; and
creating a source file comprising a function for accessing the member.

7. A system comprising:
a memory to store a user script; and
a processing device coupled to the memory to
execute an introspection tool to monitor an execution of software, the software being executed using an executable of a software source code file, the software source code file being associated with one or more additional source files,
detect a trigger in a user script pertaining to monitoring of the execution of the software, wherein the trigger comprises a variable type name or a tracepoint name,
identify an additional source file that corresponds to the trigger by identifying the additional source file that corresponds to at least one of the tracepoint name or the variable type name,
generate debug information describing a structure of the trigger by compiling the additional source file, wherein the debug information comprises at least one of functions for tracepoints that are defined in the software or information for more than one variable type name, and
identify the structure specified in the debug information to respond to the trigger in the user script by searching the debug information for a tracepoint name that matches the tracepoint name in the trigger or searching the debug information for a variable type name that matches the variable type name in the trigger.

8. The system of claim 7, wherein the trigger in the user script comprises the tracepoint name to register a callback function with.

9. The system of claim 8, wherein the processing device is to identify the additional source file that corresponds to the trigger by identifying a debug information source file as the additional source file that corresponds to the tracepoint name.

10. The system of claim 8, wherein the processing device is to identify the structure specified in the debug information to respond to the trigger further by:
identifying a function that corresponds to the tracepoint name in the debug information that matches the tracepoint name in the user script,
determining a structure of the identified function, and
creating a source file for registering the tracepoint that includes a callback function using the structure of the identified function.

11. The system of claim 10, wherein the processing device is further to:
identify a parameter and a member in the user script,
examine the debug information to determine how to access the member using the parameter, and create a source file that includes a function for accessing the member using the parameter.

12. The system of claim 7, wherein the memory further stores a plurality of header source files.

13. The system of claim 12, wherein the processing device is to identify the additional source file that corresponds to the trigger by:
  identifying a name of a header file in the user script in response to the trigger being the variable type name, and
  identifying the header file in the memory that has a name that matches the name of the header file in the user script.

14. The system of claim 7, wherein to identify the structure specified in the debug information to respond to the trigger by:
  searching the variable type name information for a member that matches the member in the user script,
  examining the member information to determine how to access the member, and
  creating a source file that includes a function for accessing the member.

15. A non-transitory computer-readable storage medium including instructions that, when executed by a processing device, cause processing device to perform a set of operations comprising:
  monitoring an execution of software, the software being executed using an executable of a software source code file, the software source code file being associated with one or more additional source files;
  detecting a trigger in a user script pertaining to monitoring of the execution of the operating system, wherein the trigger comprises a variable type name or a tracepoint name;
  identifying an additional source file that corresponds to the trigger in the user script by identifying the additional source file that corresponds to at least one of the tracepoint name or the variable type name;
  generating, by the processing device, debug information describing a structure of the trigger by compiling the additional source file, wherein the debug information comprises at least one of functions for tracepoints that are defined in the software or information for more than one variable type name; and
  identifying the structure specified in the debug information to respond to the trigger in the user script by searching the debug information for a tracepoint name that matches the tracepoint name in the trigger or searching the debug information for a variable type name that matches the variable type name in the trigger.

16. The non-transitory computer-readable storage medium of claim 15, wherein the trigger in the user script comprises the tracepoint name for which the introspection tool is to register a callback function with.

* * * * *